(12) United States Patent
Zeidman (10) Patent No.: US 6,934,947 B1
(45) Date of Patent: Aug. 23, 2005

(54) VISUAL TOOL FOR DEVELOPING REAL TIME TASK MANAGEMENT CODE

(76) Inventor: Robert Zeidman, 7599 Squirewood Way, Cupertino, CA (US) 95014

( * ) Notice: Subject to any disclaimer, the term of this patent is extended or adjusted under 35 U.S.C. 154(b) by 0 days.

(21) Appl. No.: 09/309,147

(22) Filed: May 10, 1999

(51) Int. Cl.[7] ................................................. G06F 9/46
(52) U.S. Cl. ....................... 718/100; 718/102; 718/103; 718/104
(58) Field of Search ................................ 345/594, 700; 703/23; 705/7; 709/103, 100, 106, 105, 101; 711/145; 714/31

(56) References Cited

U.S. PATENT DOCUMENTS

| | | | | |
|---|---|---|---|---|
| 4,796,179 A | * | 1/1989 | Lehman et al. ............... | 700/86 |
| 4,885,684 A | * | 12/1989 | Austin et al. ................ | 717/149 |
| 5,689,637 A | * | 11/1997 | Johnson et al. ............... | 714/46 |
| 5,872,909 A | * | 2/1999 | Wilner et al. .................. | 714/38 |
| 5,907,701 A | * | 5/1999 | Hanson ....................... | 709/101 |
| 5,999,911 A | * | 12/1999 | Berg et al. ...................... | 705/7 |
| 6,016,466 A | * | 1/2000 | Guinther et al. ............. | 702/187 |
| 6,044,394 A | * | 3/2000 | Cadden et al. ............... | 709/100 |
| 6,063,131 A | * | 5/2000 | Yoshida ....................... | 703/23 |
| 6,092,095 A | * | 7/2000 | Maytal ........................ | 709/100 |
| 6,145,098 A | * | 11/2000 | Nouri et al. ................... | 714/31 |
| 6,148,323 A | * | 11/2000 | Whitner et al. ............. | 709/105 |
| 6,212,585 B1 | * | 4/2001 | Chrabaszcz ................. | 709/220 |
| 6,230,313 B1 | * | 5/2001 | Callahan, II et al. ....... | 717/128 |
| 6,272,648 B1 | * | 8/2001 | Findlay et al. .............. | 711/145 |
| 6,282,701 B1 | * | 8/2001 | Wygodny et al. ........... | 717/125 |
| 6,314,446 B1 | * | 11/2001 | Stiles .......................... | 709/100 |
| 6,385,664 B1 | * | 5/2002 | Drees .......................... | 709/100 |
| 6,593,940 B1 | * | 7/2003 | Petersen et al. ............. | 345/700 |

OTHER PUBLICATIONS

Peter Alken et al. Microsoft Computer Dictionary. 2002. Microsoft Press. 5th Edition. p. 45.*

* cited by examiner

*Primary Examiner*—Ayaz Sheikh
*Assistant Examiner*—Christian LaForgia
(74) *Attorney, Agent, or Firm*—Edward C. Kwok; MacPherson Kwok Chen & Heid LLP (57) ABSTRACT

A tool for developing software code for real time system allows the user to structure scheduling of multi-tasking operations into a polling loop without the complexity of a hand-crafted polling loop, while preventing deadlocks between the real time tasks. The tool provides commands for calling other real time tasks and for waiting for completion of other tasks. The tool can be used to synthesize code of any specified programming language.

9 Claims, 11 Drawing Sheets

```
;       PROJECT:    SWORDFISH - Main Routine
;       FILE:       MAIN. ASM
;       COMMENT:    Created by VIRTOS synthesis
;.............................................................................
;       DATE        VER    COMMENTS        AUTHOR
;       ---------------------------------------------------------------------
;
;.............................................................................
;
; ROUTINE:  Main
;
; INPUT PARAMETERS:                                                          601
;  none
;
; OUTPUT PARAMETERS:
;  none
;
; DESCRIPTION:
;  Main polling loop for task management
;  This is a project to run a high resolution monitor
;.............................................................................
;
; Special compiler directives
;                                                                            602
$ Base 10T              ; Use decimal defaults ; Include files         ; Comments are from the synthesis file
                        ; that the user created $ INCLUDE "swordfish.inc"   ; Project definitions
$ INCLUDE "macros.inc"      ; Macro definitions
$ INCLUDE "global.inc"      ; Global variables
$ INCLUDE "stack.inc"       ; Reserve space for the stack
$ INCLUDE "int_vect.inc"    ; Interrupt vector table
$ INCLUDE "tables.inc"      ; Tables of data in memory
$ INCLUDE "message.inc"     ; Error message strings               603

; All subroutine definitions
;     for a high level language these would be linked
;     by the linker rather than included as shown here $ INCLUDE "isr.asm"         ; Interrupt service routines
$ INCLUDE "power.asm"       ; Power management routines
$ INCLUDE "kbd.asm"         ; Keyboard routines
$ INCLUDE "timer.asm"       ; Timer routines
$ INCLUDE "osd.asm"         ; On-screen display routines
$ INCLUDE "scsi.asm"        ; SCSI control routines
$ INCLUDE "debug.asm"       ; Debug routines
```

*FIG. 6(a)*

```
; MAIN ROUTINE
;
main:
; Initialization tasks
        jsr    InitTask1           ; perform init task 1
        jsr    InitTask2           ; perform init task 2
        jsr    InitTask3           ; perform init task 3
;                                  ; etc
; Polling loop
;
LoopStart:                                                                  ← 605

LoopTask1_label:                   ; LoopTask1, priority 1
        lda    LoopTask1StateFlag  ; Check the loop task 1 state flag
        beq    LoopTask2_label     ; If it's 0, do not call the task
        jsr    LoopTask1           ; Otherwise call the task LoopTask2_label:                   ; LoopTask2, priority 2
        lda    LoopTask2StateFlag  ; Check the loop task 2 state flag
        beq    LoopTask3_label     ; If it's 0, do not call the task
        lda    LoopTask1StateFlag  ; Check all higher priority tasks
        bne    LoopTask3_label     ; If there is a higher priority task, skip this one
        jsr    LoopTask2           ; Otherwise call the task LoopTask3_label:                   ; LoopTask3, priority 2
        lda    LoopTask3StateFlag  ; Check the loop task 3 state flag
        beq    LoopTask4_label     ; If it's 0, do not call the task
        lda    LoopTask1StateFlag  ; Check all higher priority tasks
        bne    LoopTask4_label     ; If there is a higher priority task, skip this one
        jsr    LoopTask3           ; Otherwise call the task LoopTask4_label:                   ; LoopTask2, priority 3
        lda    LoopTask1StateFlag  ; Check the loop task 1 state flag
        beq    LoopStart           ; If it's 0, do not call the task
        lda    LoopTask1StateFlag  ; Check all higher priority tasks
        bne    LoopStart           ; If there is a higher priority task, skip this one
        lda    LoopTask2StateFlag  ; Check all higher priority tasks
        bne    LoopStart           ; If there is a higher priority task, skip this one
        lda    LoopTask3StateFlag  ; Check all higher priority tasks
        bne    LoopStart           ; If there is a higher priority task, skip this one
        jsr    LoopTask4           ; Otherwise call the task
        bra    LoopStart           ; Begin the loop again
```

```
;*******************************************************************************
;*      PROJECT:    SWORDFISH - PLL Control Routine
;*      COMMENT:    Contains the LOOP task for controlling the PLL.
;*******************************************************************************
;*         DATE      VER    COMMENTS        AUTHOR
;*      ----------------------------------------------------------------------
;*         08/25/98  V1.0   CREATION        Bob Zeidman
;*******************************************************************************
; ROUTINE:  PLL_adj
;
; INPUT PARAMETERS:
; PhaseValue:
;
; OUTPUT PARAMETERS:
; none                       Contains new PLL phase value
;
; REGISTERS USED
; ACC
; PHASE_TCHH
;
; DESCRIPTION:
; This routine adjusts the Pulse Width Modulated output which determines
; the PLL phase.
;*******************************************************************************
PLL_adj:
                                        ; Wait for the SCSI device to be idle
        VIRTOS_wait ( SCSI_task )
                                        ; Load the new PLL phase value into the accumulator
        lda  PhaseValue                 ; Store it in a register
        sthx PHASE_TCHH                 ; Call the SCSI_task LOOP task to read the current
                                        ; value of the PLL
        VIRTOS_call (
                SCSI_task ( ScsiDevice = PLL_DEV, ScsiDirection = READ) ,
                TRUE)
                                        ; Adjust the value of the PLL to the new value
        mov  {SpiRData+1}, {SpiTData+1}
        lda  PhaseValue
        sub  #PHASE_POS
        sta  PhaseTemp
        lda  SpiRData
        ora  #{FPHADJb > 8}
        sta  SpiTData
                                        ; Call the SCSI_task LOOP task to write the new
        VIRTOS_call (                   ; value back to the PLL
                SCSI_task ( ScsiDevice = PLL_DEV, ScsiDirection = WRITE) ,
                FALSE)
                                        ; We're done
;*******************************************************************************
```

*FIG. 8(a)*

```
;**************************************************
;   PROJECT:    SWORDFISH - PLL Control Routine
;   COMMENT:    Contains the LOOP task for controlling the PLL.
;   COMMENT:    Modified by VIRTOS synthesis
;**************************************************
;   DATE       VER    COMMENTS    AUTHOR
;--------------------------------------------------
;   08/25/98   V1.0   CREATION    Bob Zeidman
;**************************************************
; ROUTINE:  PLL_adj
;
; INPUT PARAMETERS:
; PhaseValue:              Contains new PLL phase value
; OUTPUT PARAMETERS:
; none
;
; REGISTERS USED
; ACC
; PHASE_TCHH
;
; DESCRIPTION:
; This routine adjusts the Pulse Width Modulated output which determines
; the PLL phase.
;**************************************************
PLL_adj:
        lda  PLL_adjState            ; Go to the correct code, depending on the current
                                     ; state of execution
        cbeqa #1, PLL_adjState1
        cbeqa #2, PLL_adjState2
PLL_adjState1:
        lda  SCSI_taskState
        cbeqa #NOT_BUSY, PLL_adjState1a
        rts
PLL_adjState1a:
        lda  PhaseValue              ; Load the new PLL phase value into the accumulator
        sthx PHASE_TCHH              ; Store it in a register
                                     ; Call the SCSI_task LOOP task to read the current
                                     ; value of the PLL
        lda  #START
        sta  SCSI_taskState          ; Start the SCSI task by setting its state flag
        lda  #PLL_DEV                ; Set the SCSI_task parameters to the correct values
        sta  ScsiDevice              ; The SCSI device to access is the PLL
        lda  #READ
        sta  ScsiDirection           ; The direction of transfer is a read
        inc  PLL_adjState            ; Increment the state variable
        rts                          ; return to the polling loop
PLL_adjState2:
        lda  SCSI_taskState          ; Wait for SCSI_task to complete
        cbeq #NOT_BUSY, PLL_adjState2a
        rts
PLL_adjState2a:
        mov  {SpiRData+1}, {SpiTData+1}
        lda  PhaseValue
        sub  #PHASE_POS
```

*FIG. 8(b)-1*

```
          sta   PhaseTemp
          lda   SpiRData
          ora   #{FPHADJb > 8}
          sta   SpiTData
                                    ; Call the SCSI_task LOOP task to write the new
                                    ; value back to the PLL
                                    ; Write back the new fine adjustment
          lda   #START
          sta   SCSI_taskState       ; Start the SCSI task by setting its state flag
          lda   #PLL_DEV             ; Set the SCSI_task parameters to the correct values
          sta   ScsiDevice           ; The SCSI device to access is the PLL
          lda   #WRITE
          sta   ScsiDirection        ; The direction of transfer is a write
          lda   #NOT_BUSY            ; Put the state flag back to the NOT_BUSY (0) state
          sta   PLL_adjState
          rts                        ; Return to the polling loop
```
··········································································

FIG. 8(b)-2

```
        lda  LoopTask1State        ; Go to the correct code state, depending
                                   ; on the current state of execution.
                                   ; This example shows three states. There can
                                   ; be more or less.
        cbeqa #1, LoopTask1State1
        cbeqa #2, LoopTask1State2
        cbeqa #3, LoopTask1State3
```

FIG. 9(a)

```
LoopTaskState1:
        lda  LoopTask2State         ; Look at the LoopTask1State and
                                    ; continue only if it is not busy.
        cbeqa #NOT_BUSY, LoopTask2State1a
        rts                         ; Otherwise return to the polling loop.
LoopTaskState1a:
                                    ; Continue execution.
```

FIG. 9(b)

```
        lda  #START                 ; Start the LOOP task by setting its state flag.
        sta  LoopTask2State         ; Set the parameters to the correct values.
        lda  #VAL1                  ; The SCSI device to access is the PLL.
        sta  Task2Param1
        lda  #VAL2
        sta  Task2Param2
        inc  LoopTask1State         ; Increment the current task's state flag.
        rts                         ; Return to the polling loop.

LoopTaskState1:
        lda  LoopTask2State         ; Look at the LoopTask2State.
                                    ; Continue only if LoopTask2 has finished.
        cbeqa #NOT_BUSY, LoopTask2State1a
        rts                         ; Otherwise return to the polling loop.
LoopTaskState1a:
                                    ; Continue execution.
```

FIG. 9(c)

```
        lda  LoopTask2State         ; Load the LOOP task state flag
        sta  TaskTest               ; Save it in the TaskTest variable
```

FIG. 9(d)

| | | |
|---|---|---|
| cbeqa #CONST, Label1 | ; | If the accumulator is equal to the constant CONST, then branch to label Label1 |
| inc Var1 | ; | Increment the Var1 variable |
| lda #CONST | ; | Load accumulator register with the value of the CONST contant |
| lda Var1 | ; | Load accumulator register with the value of the Var1 variable |
| mov Var1, Var2 | ; | Move the value of variable Var1 into variable Var2 |
| ora #CONST | ; | OR the value of the CONST contant into the accumulator register |
| ora Var1 | ; | OR the value of the Var1 variable into the accumulator register |
| rts | ; | Return from a subroutine call |
| sta #CONST | ; | Store the value of the CONST contant in the accumulator register |
| sta Var1 | ; | Store the value of the Var1 variable in the accumulator register |
| sthx Var2 | ; | Concatenate the H and X registers and store the resulting value into double-size variable Var2. |
| sub #CONST | ; | Subtract the value of the CONST contant from the accumulator register |
| sub Var1 | ; | Subtract the value of the Var1 variable from the accumulator register |
| Label1: | ; | A label used for branching |

FIG. 10

VISUAL TOOL FOR DEVELOPING REAL TIME TASK MANAGEMENT CODE

BACKGROUND OF THE INVENTION

1. Field of the Invention

The present invention relates to tools for software development. In particular, the present invention relates to a tool for developing real time systems.

2. Discussion of the Related Art

In a typical real time system, the central processing unit (CPU) performs a number of response time-critical tasks under a schedule controlled by a kernel of a real time operating system (RTOS). Under the schedule, each task is allocated a limited amount ("slice") of time, so that no single task can hoard the CPU—a scarce resource—to the detriment of other tasks. The time allocated to a given task can vary according to an assigned priority of the task. Kernels of RTOS's are available commercially from a number of vendors.

Figure 1:
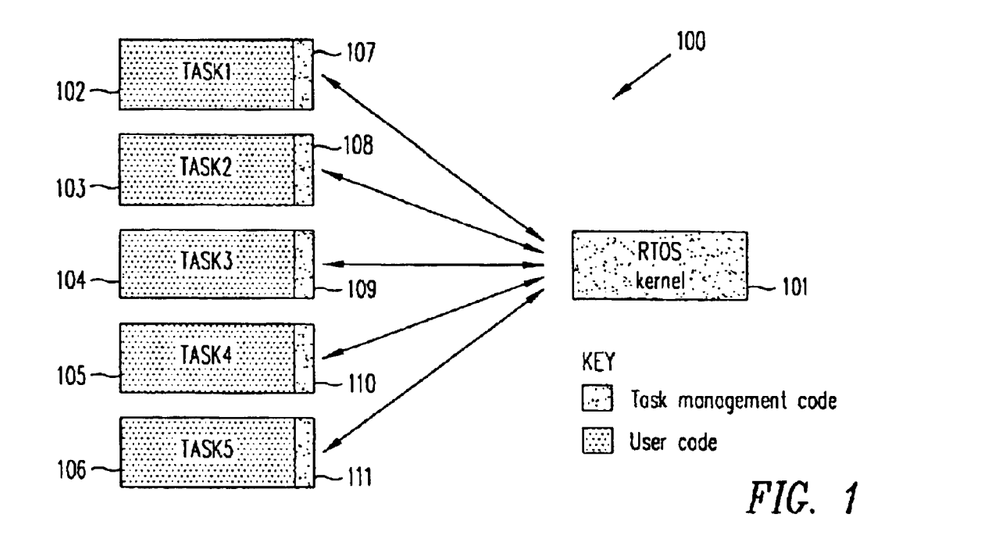
FIG. 1 is a block diagram of a real time operating system 100.

FIG. 1 is a block diagram of a real time operating system 100. As shown in FIG. 1, RTOS 100 includes kernel 101 which controls the scheduling of a number of tasks 102–106 through interfaces 107–111, respectively. An example of a task is an interrupt service routine for handling an interrupt from a peripheral hardware device. Interfaces 107–111 are each a small program section of the task which communicates with "hooks" in kernel 101. Naturally, interfaces 107–111 conform to the interface requirements of RTOS 100. Kernel 101 allocates time slices and assigns a priority to each task, and activates or deactivates a task through the associated interface according to the time slices and the priority assigned. For example, kernel 101 ensures that an interrupt service task begins execution within a predetermined maximum latency from an interrupt. Kernel 101 is also responsible for such "house-keeping" tasks as garbage collection and prevention of deadlocks (i.e., two or more tasks waiting for each other to complete executing, resulting in none of the tasks being able to proceed).

Figure 2:
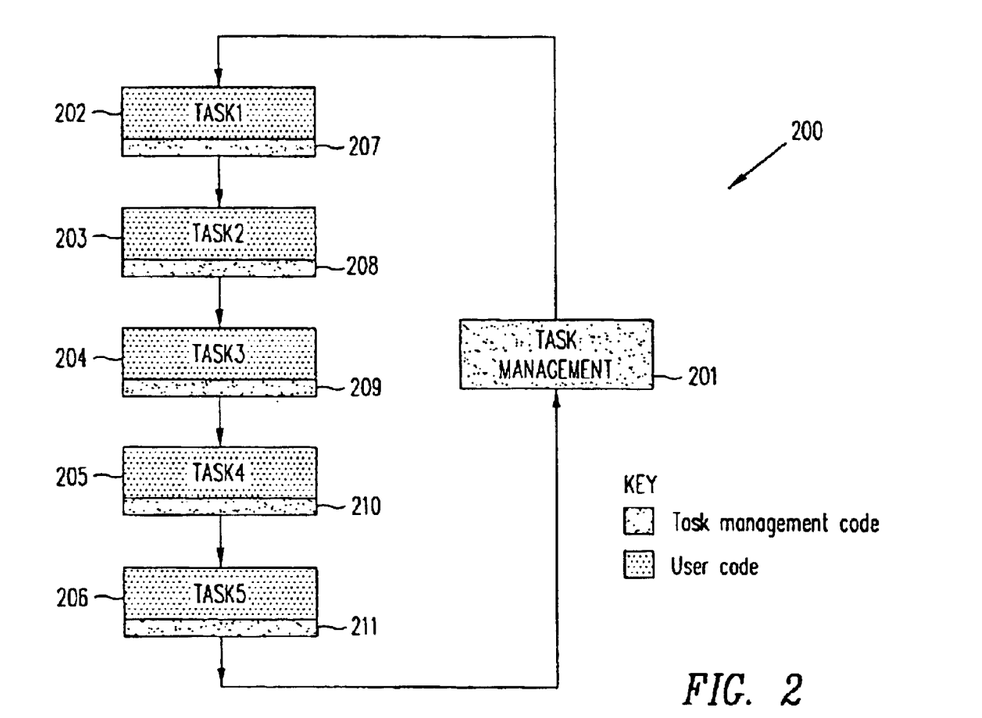
FIG. 2 shows polling loop 200 for managing tasks 202–206.

An alternative to managing the schedule from commercially available kernel 101 is a task management scheme that is illustrated by polling loop 200 shown in FIG. 2. Polling loop 200 is typically created by a system programmer for a specific application.

To implement polling loop 200, the system programmer provides "task management" task 201 and task management code included in the program code of each of interface 207–211 of tasks 202–206. Typically, scheduling using a polling loop is simpler than that provided in kernel 101 and thus requires less memory space for task management. Further, since only the necessary task management code needs to be included in interfaces 207–211, the bulkiness of a generic driver suitable for use with many tasks is avoided. Consequently, a polling loop is both memory-space efficient and easier to debug, and typically provides a shorter response time. However, timing in a polling loop is less predictable than the kernel approach, and the management code that is necessary in each task interface is written in each instance by the system programmer implementing the polling loop. Unlike an RTOS kernel, which is available commercially in debugged form and supported with service and upgrades, the polling loop must be maintained by the system programmer, including the code for performing housekeeping tasks and preventing deadlocks.

SUMMARY OF THE INVENTION

The present invention provides a "virtual" RTOS which automates the process of creating a polling loop, so that many advantages of an RTOS kernel (e.g., insulating the intricacies of task management from the code implementing the task, or preventing deadlocks) are achieved. Such a virtual RTOS can be offered commercially as a packaged product, with the benefits of a product that is professionally developed, debugged and supported. The virtual RTOS maintains the advantages of the polling loop, i.e., simplicity, smaller footprint (by including only the necessary code), and high performance.

In one embodiment, the virtual RTOS includes a timing analysis module which provides estimates of response latency. In addition, the virtual RTOS includes a library of prepackaged tasks, including such housekeeping tasks as garbage collection, which can be selectively included in the polling loop.

According to one aspect of the present invention, a method is provided for developing a real time task management system, which includes the steps of: (a) providing commands to be used in the source codes of real time tasks (these commands being designed to provide synchronization among the real time tasks); (b) synthesizing code for controlling a polling loop including the real time tasks; (c) synthesizing code for the commands used in the real time tasks; and (d) compiling the synthesized code for controlling said polling loop and the synthesized code for the commands.

In the above-discussed method, the commands specify (a) waiting for the completion of another real time task, (b) initializing another real time task, (c) executing another real time task; and (d) reporting the execution state of another real time task.

In accordance with one aspect of the present invention, a graphical user interface is provided to allow a human user to enter information necessary to synthesize the polling loop code. In one embodiment, each task in the polling loop is assigned a priority to allow preemption in executing tasks in the polling loop. Because the synthesized code are synthesized taking into consideration task priorities, deadlocks are prevented by design.

The polling loop of the present invention can be used to provide interrupt service tasks.

The present invention is better understood upon consideration of the detailed description below and the accompanying drawings.

BRIEF DESCRIPTION OF THE DRAWINGS

To facilitate cross-reference among the figures and to simplify the detailed description below, like elements in the figures are assigned like reference numerals.

DETAILED DESCRIPTION OF THE PREFERRED EMBODIMENTS

Figure 3:
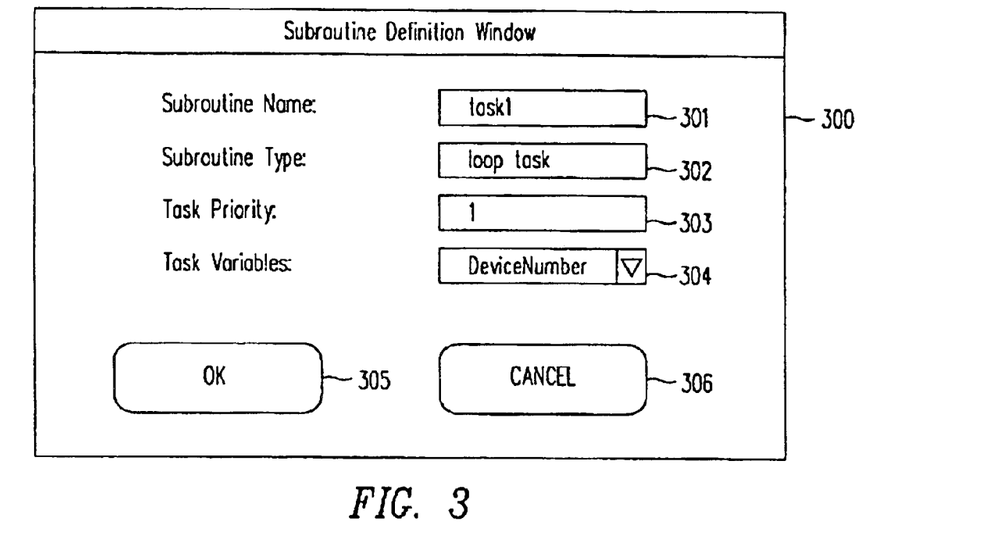
FIG. 3 shows a dialog box 300 in the graphical user interface for specifying a subroutine.

The present invention provides a "virtual" RTOS ("VIRTOS") which automates the process of creating a polling loop. The VIRTOS includes a graphical user interface for interacting with the human real time system programmer or user. Such a graphical user interface can be created, for example, using a commercially available toolkit for use on a personal computer or a workstation. FIG. 3 shows, for example, a dialog box 300 in the graphical user interface for specifying a subroutine.

As shown in FIG. 3, VIRTOS queries the user to provide (a) a task name (301), and (b) a subroutine type (302). In this embodiment, four subroutine types are supported: (a) COMMON subroutine, (b) INIT task; (c) LOOP task and (d) ISR task. A COMMON subroutine performs a specified function, and can be called from the other subroutines or tasks. An INIT task is a subroutine which is called once by the task management code to initialize a LOOP task or an ISR task. A LOOP task is a task which is provided in the polling loop to be invoked repeatedly. An ISR task is an interrupt service routine, which is called when the CPU receives an interrupt. To prevent an ISR task from unduly tying up the CPU while a higher priority task waits, the ISR task is typically used to set only a task state flag of an associated LOOP task and returns immediately thereafter. In this manner, very little processing is actually performed in the ISR task. The actual servicing of the hardware component generating the interrupt is handled by the associated LOOP task, after higher priority tasks are serviced.

Referring again to FIG. 3, since the specified subroutine in this instance is a LOOP task, the graphical user interface queries the user for (a) a task priority (303), and (b) a set of task parameters or variables (304) visible to other tasks, which may be required to be set before the task is called. The task priority determines the order of task execution when multiple tasks are ready. After the user completes fields 301–304, the user selects "OK" button 305 to indicate completion. Alternatively, the user can select "CANCEL" button 306 to abandon specifying the subroutine.

When the user selects "OK" button 305, VIRTOS creates a new record in an internal database for the task created. In addition to the subroutine name, the subroutine type and the task variables discussed above, the record in the database includes also (a) a set of arguments used in calling the task, and (b) for a LOOP task, a task state flag, which is used by the associated LOOP task to determine the state of execution. Specifically, the task state flag can take one of a number of values: (a) "0", indicating that the task is not executing, (b) "1", indicating that the task has been called, but not yet executed, and (c) "2" or greater, indicating an executing state represented by the numeric value of the task state flag.

Figure 4:
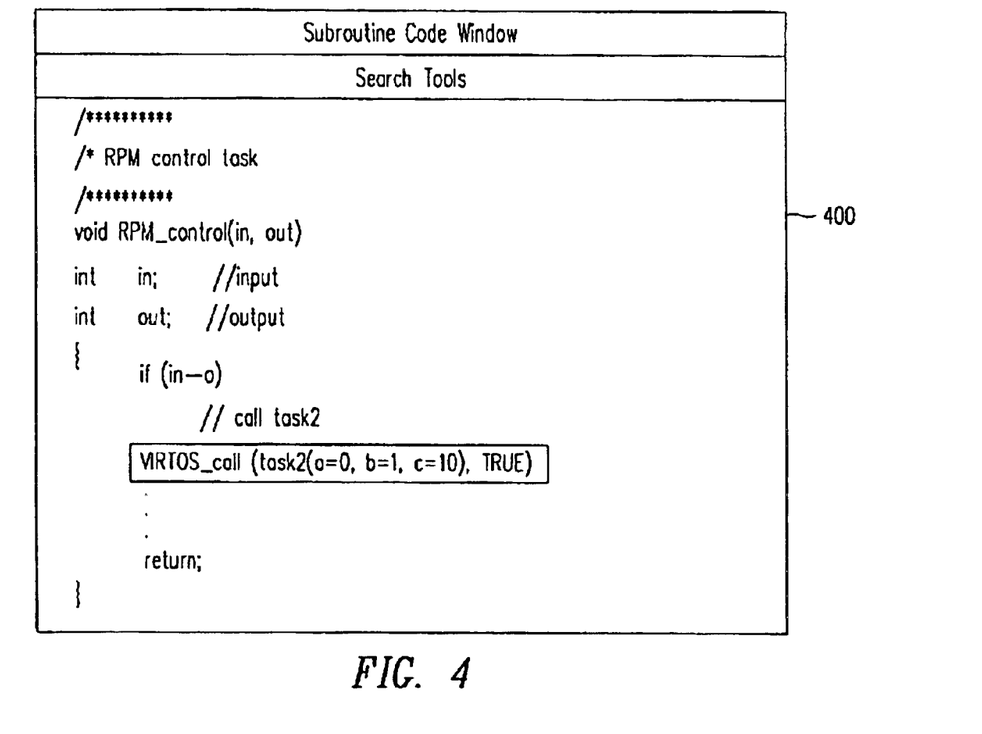
FIG. 4 shows subroutine code window 400, which provides an editor environment for entering and editing code.

Next, VIRTOS brings up an editor environment, called the "subroutine code window", to allow the user to enter and edit code that constitutes the task. VIRTOS can support any computer language (e.g., Java, C, C++, BASIC, PASCAL, or any assembly language) for coding the tasks. FIG. 4 shows, as an example, subroutine code window 400. As in any modern development system, VIRTOS allows multiple dialog windows and subroutine code windows to be open simultaneously. In FIG. 4, subroutine code window 400 shows the code of a LOOP task "RPM_control" which calls a VIRTOS command. In this implementation, three VIRTOS commands are provided:

(a) void VIRTOS_call( task_name(argument_list), wait);

(b) integer VIRTOS_check(task_name); and (c) void VIRTOS_wait(task_name).

The command VIRTOS_call calls the task specified by task_name, using a list of values provided in "argument_list." Argument_list is provided in the form of (a=<value>, b=<value>. . . ). "Wait" is a Boolean value indicating whether or not the current task should wait for complete execution of the called task (i.e., the task specified by task_name). VIRTOS_check returns a numeric value indicating whether the task specified by task_name is executing. VIRTOS_wait suspends execution of the current task until the task specified by task_name completes execution.

When all tasks of a polling loop are defined, the polling loop can be synthesized by a code synthesizer. VIRTOS provides a graphical user interface for the user to specify the tasks in the polling loop and the files necessary to create the code of the polling loop which can be compiled.

Figure 5:
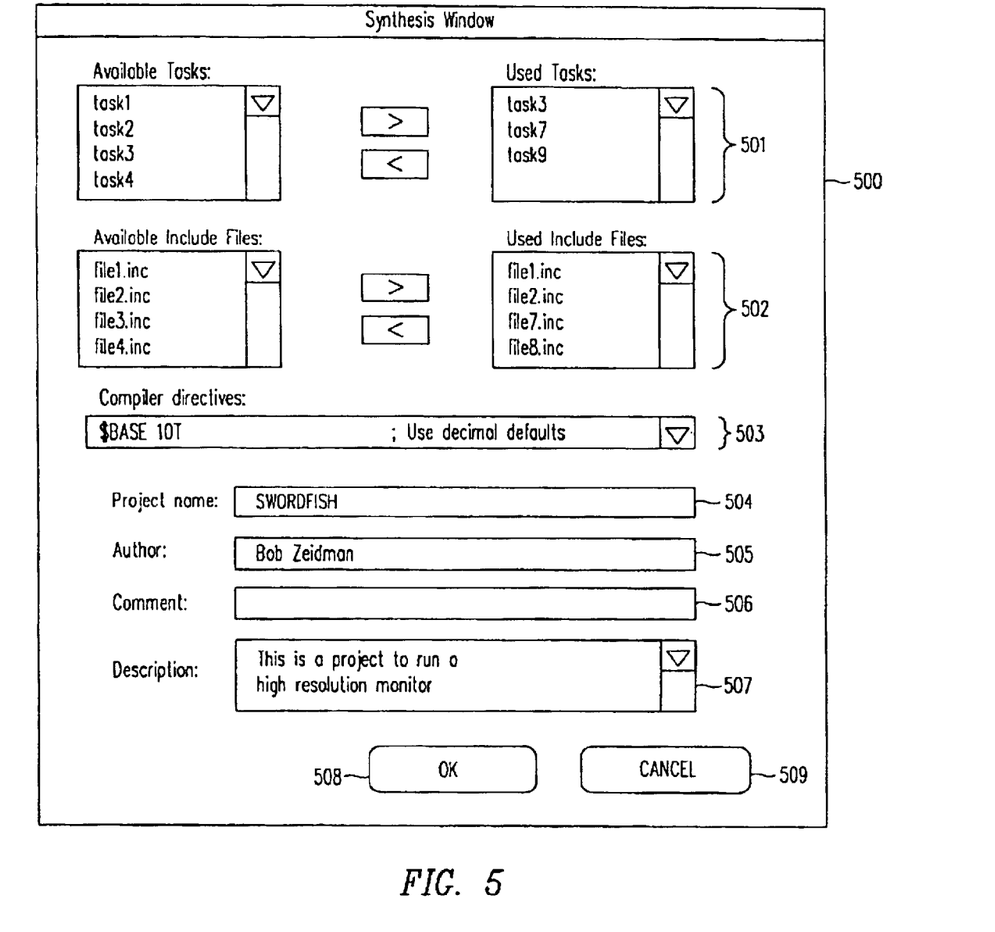
FIG. 5 shows dialog box 500 of a graphical user interface of VIRTOS for specifying the tasks in a polling loop and the files necessary to compile the polling loop.

FIG. 5 shows dialog box 500 of the graphical user interface. As shown in FIG. 5, in section 501 of dialog box 500, the user is queried to provide a list of tasks to be included by the code synthesizer to create synthesized code of the polling loop that can be compiled. At section 502 of dialog box 500, the user is queried to provide a list of files to be included by the code synthesizer to create synthesized code of the the polling loop that can be compiled. At section 503, the user is queried for directives to a compiler that are necessary to configure the compiler to create the executable code from the synthesized code. Respectively, at sections 504–507, the user is queried to provide identifying and descriptive information to be included in a comment header of the synthesized code: (a) a project name; (b) the author's name; (c) some comments to be included; and (d) any other descriptive information. Upon completing dialog box 500 (i.e., after the user provides the requested information and selects the "OK" button 508), the synthesized code is created by (a) creating a main polling loop that manages the tasks, and (b) replacing all of the VIRTOS commands by actual code that would execute the intended function of the replaced VIRTOS commands. If the user selects "CANCEL" button 509, the operation is aborted, and no directive would be generated for code synthesis.

Figure 6A:
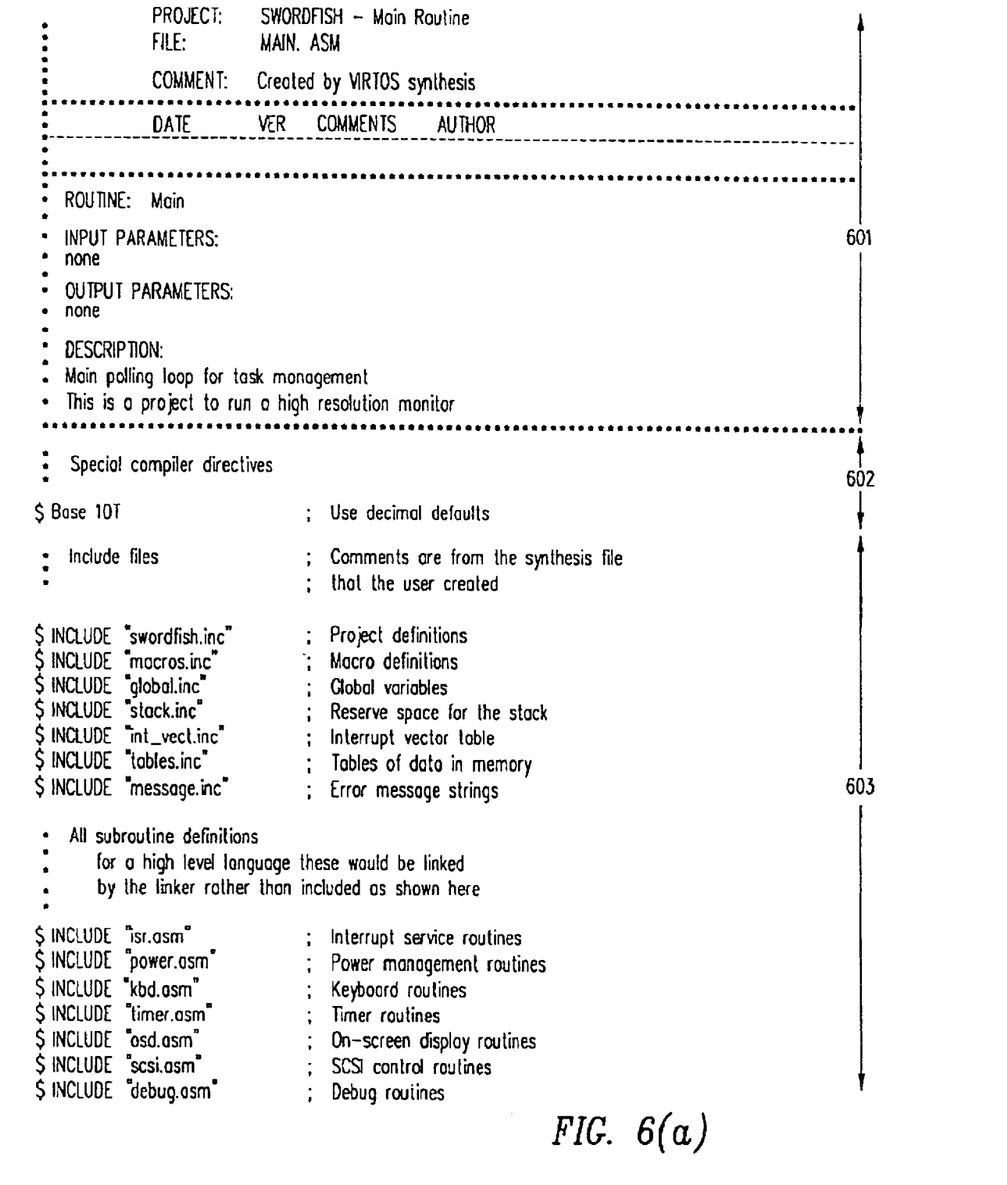
FIG. 6, consisting of FIGS. 6(a) and 6(b), shows an example 600 of the synthesized code of a polling loop.
Figure 7:
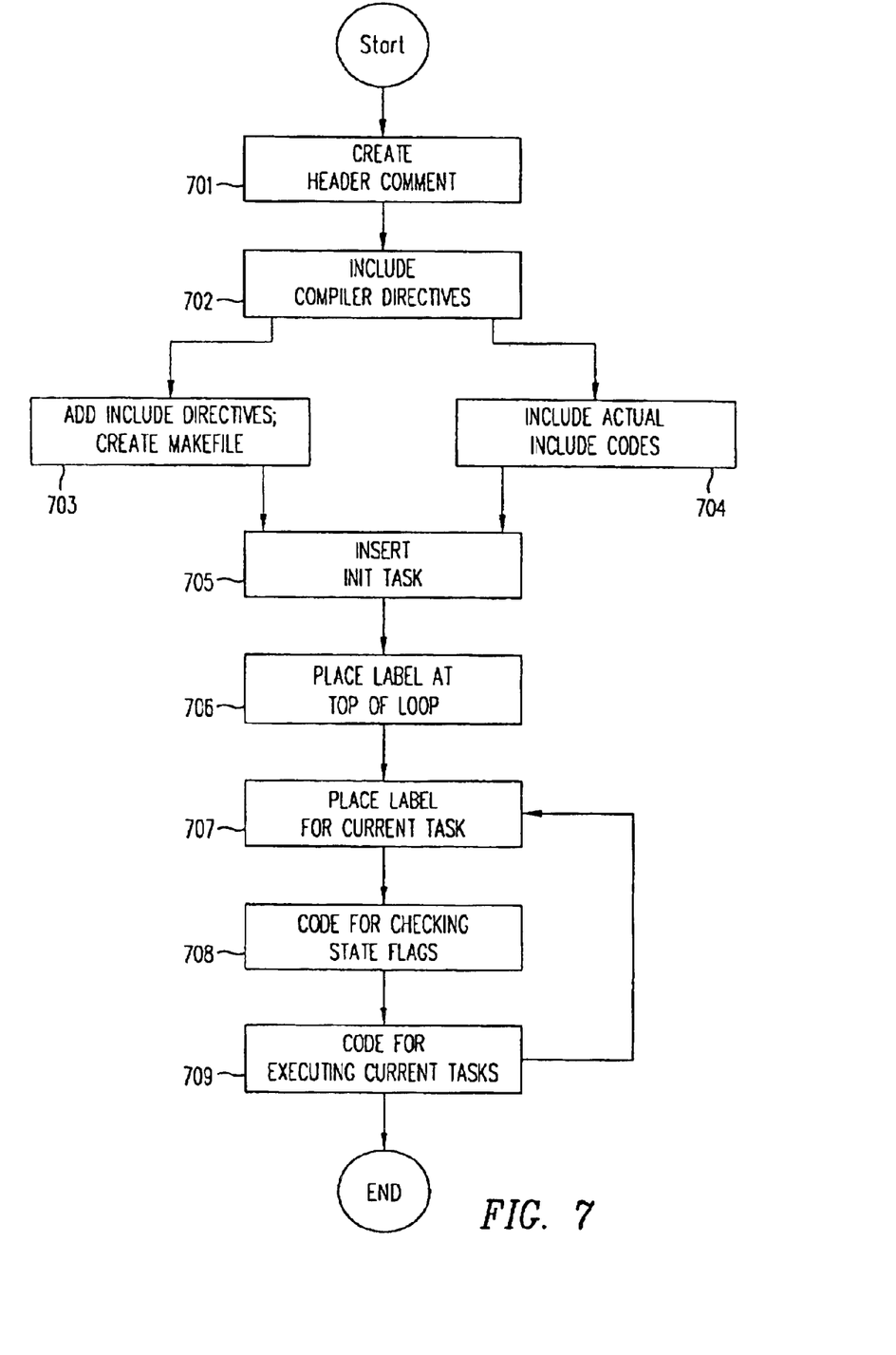
FIG. 7 shows flow chart 700 which provides the steps used in one embodiment of the present invention to synthesize a polling loop.

FIG. 7 shows flow chart 700 which provides the steps used in one embodiment of the present invention to synthesize a polling loop. An example 600 of the synthesized code of a polling loop using the steps of FIG. 7 is shown in FIG. 6. In this example, for illustration only, the synthesized code is expressed in Motorola HC08 Assembly Language. At step 701, section 601 of FIG. 6 is created from the identifying and descriptive information of sections 504–507 discussed above with reference to FIG. 5. At step 702, section 602 is created to provide the compiler directives specified in section 503 of FIG. 5. At step 703, the include files specified at section 502 of FIG. 5 are referenced at section 603 of the synthesized code using "190 INCLUDE" directives, which direct the compiler to include the text in these files during compilation. At step 704, the actual code of each include files are inserted at this step into the synthesized code. Alternatively, a source control tool (e.g., the "makefile" facility available in most UNIX environments) can be used to ensure the necessary files are included for proper compilation and linking.

At step 705, INIT tasks for initializing the tasks in the polling loop are synthesized into section 604. At step 706, a label ("LoopStart" in this example) representing the beginning of the polling loop is placed into section 605. Then, steps 707–709 are repeated for each LOOP task to place the synthesized code for each LOOP task into section 606. At step 707, a label (e.g., any of "LoopTask1_label", "LoopTask2_label", "LoopTask3_label", and "LoopTask4_label") is placed into section 606 to indicate the beginning of the current loop task. At step 708, code is synthesized into section 606 for checking state flags. In this code, if the state flag for the current task is not set, the current task has not been called. If the current task is not called, the code branches either to the next LOOP task or, if the current task is the last task in the polling loop, back to the top of the polling loop. However, if the current flag is set (i.e., the current task has been called), the code then checks the state flags of all higher priority tasks to determine if the current task should be preempted. In this example, since task 4 has a priority of 3, which is lower than all of tasks 1, 2 and 3, if any of the state flags of tasks 1, 2 and 3 is set, the code branches to the beginning of the polling loop. At step 709, code for executing the current task is placed in section 606 after the code for checking the state flags. Steps 707–709 are repeated until the synthesized code for all LOOP tasks are synthesized. Deadlocks are prevented by synthesizing the polling loop according to task priorities.

Figure 8A:
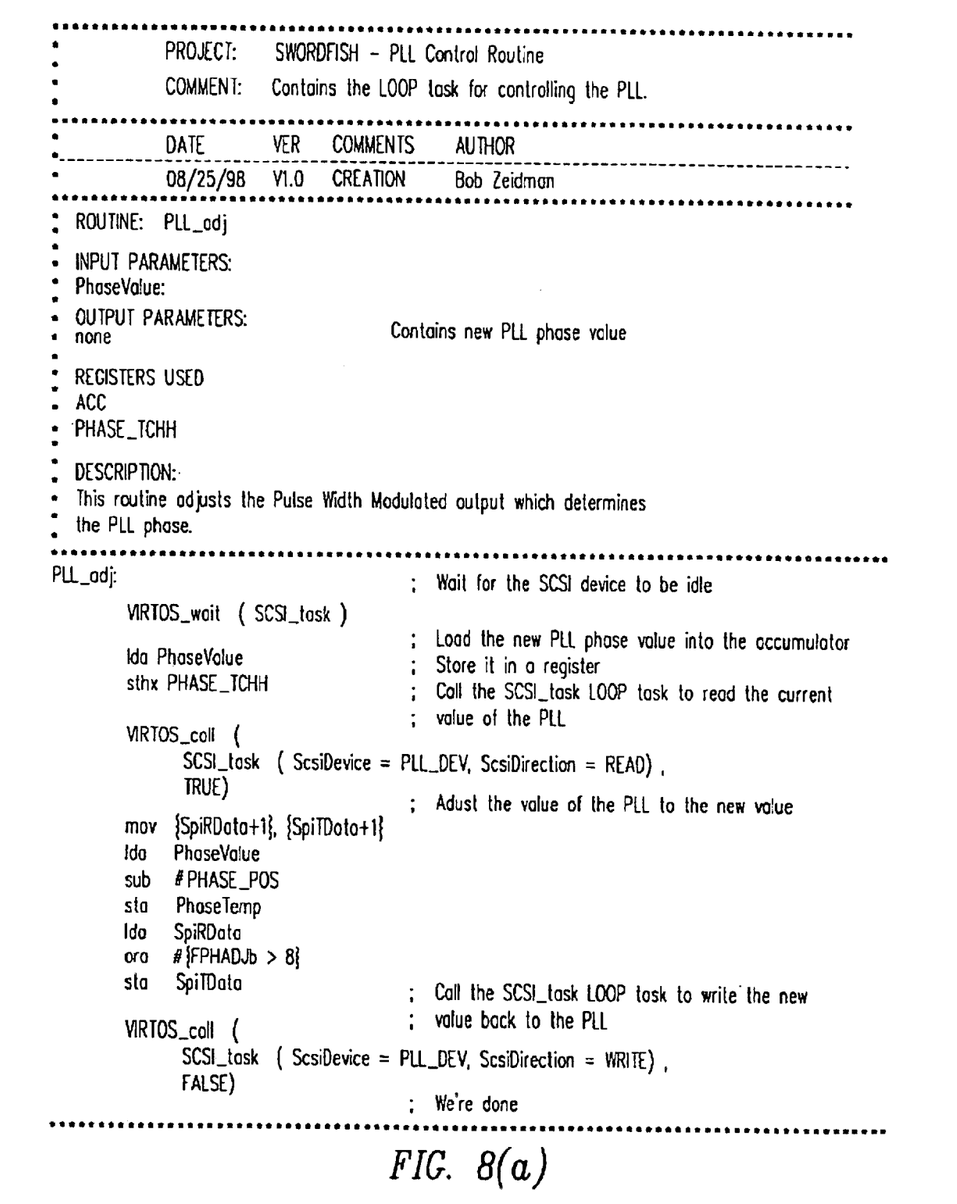
FIG. 8(a) shows a task 800 which includes VIRTOS co and "VIRTOS_wait" and "VIRTOS_call".
Figure 8B:
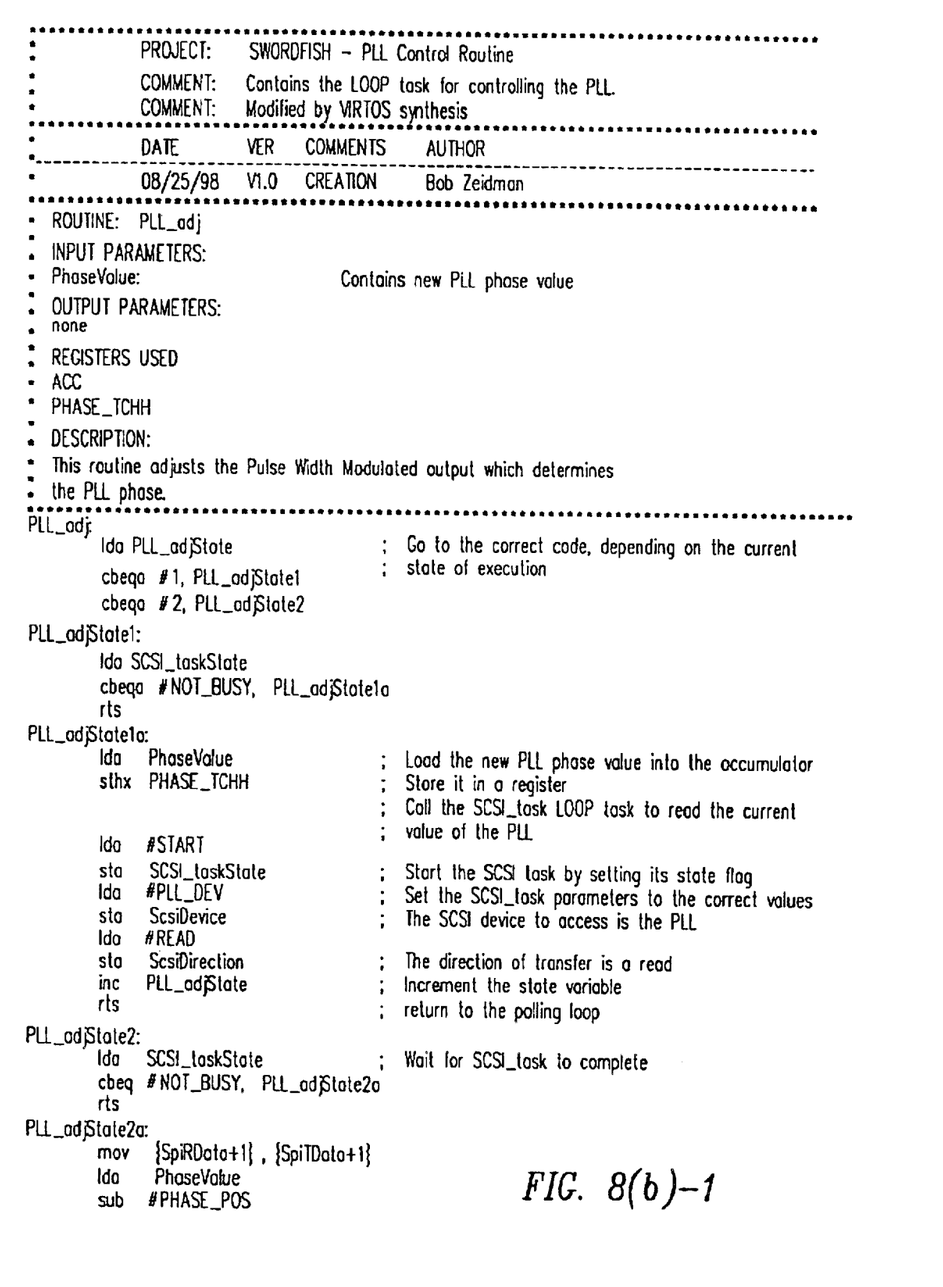
FIG. 8(b), consisting of FIGS. 8(b)(1) and 8(b)(2), shows the synthesized code for task 800.
Figure 8B:
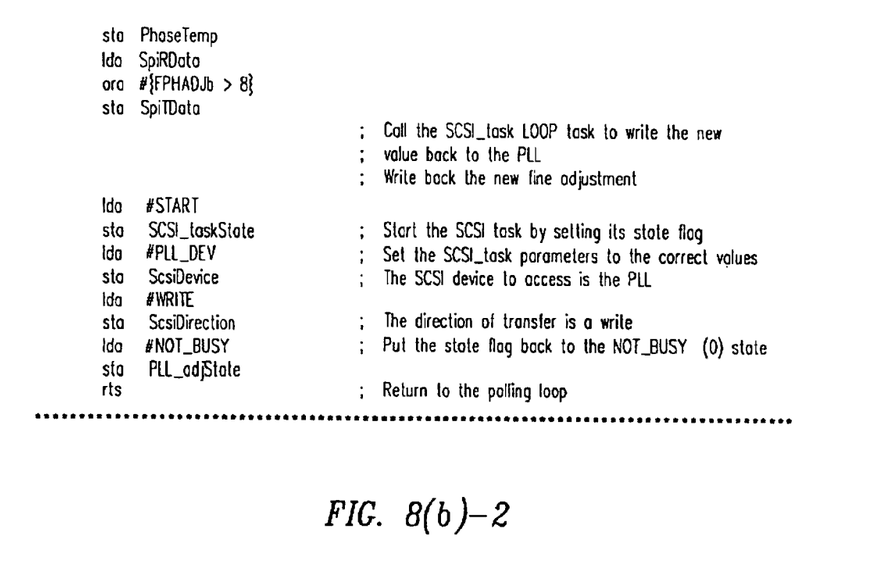

Beside synthesizing compilable code for the polling loop, the code for VIRTOS commands are also synthesized. FIG. 8(*a*) shows a task 800 which includes VIRTOS commands "VIRTOS_wait" and "VIRTOS_call". FIG. 8(*b*) shows the synthesized code for task 800.

Figure 9A:
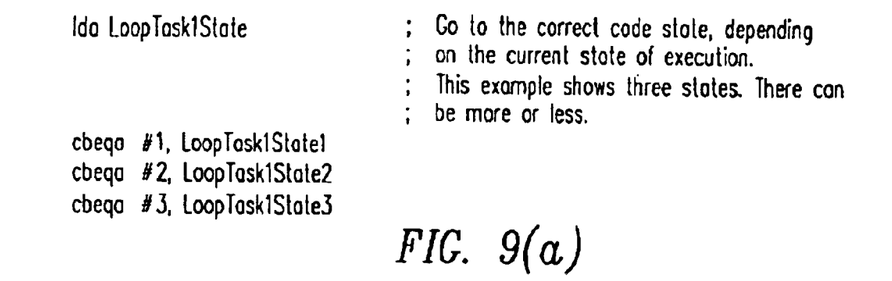
FIG. 9(a) shows the synthesized code for implementing states for a task.

The example shown in FIG. 8(*a*) is a task ("pll_adj task") for adjusting the phase of a phase-locked loop (PLL). As shown in FIG. 8(*a*), the pll_adj task waits for another task "SCSI task" to become idle, using the VIRTOS command "VIRTOS_wait", and then makes two calls to the SCSI_task, using VIRTOS command "VIRTOS_call". In the first VIRTOS_call command, the pll_adj task is to suspend until the called task SCSI_task completes. However, in the second VIRTOS_call command, the pll_adj task returns before the called SCSI_task completes. Thus, analyzing the state requirements of the pll_adj task, VIRTOS synthesizes two entry points "PLL_adjState1" and "PLL_adjState2" for the pll_adj task, based on the state flag "PLL_adjState". The entry points divide the pll_adj tasks into two sections, and are provided immediately following the respective wait events (i.e., immediately following the VIRTOS_wait command and the first VIRTOS_call command). Under this arrangement, the pll_adj task can return control to the polling loop when the SCSI_task has not completed. When the SCSI_task completes, the pll_adj task branches to the entry point. At the end of each section, the state flag PLL_adjState is incremented. In general, VIRTOS synthesizes the entry points of a task according to the required states of a state flag by including the code such as shown in FIG. 9(*a*).

Figure 9B:
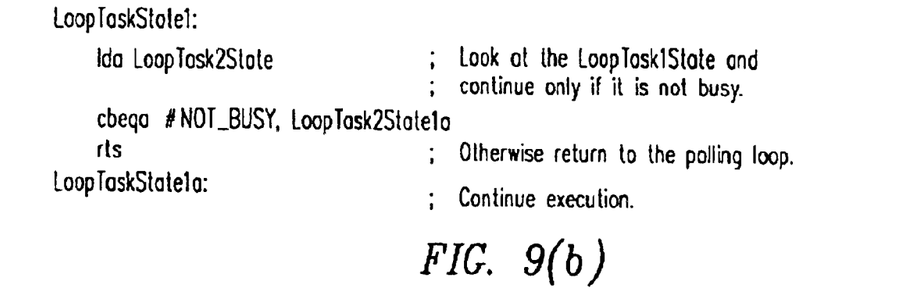
FIG. 9(b) shows the synthesized code for the VIRTOS_wait command.

For the VIRTOS_wait command, VIRTOS synthesizes code for checking the state flag of the SCSI_task, and for branching to entry point PLL_adjState1*a*, when the SCSI_task completes. If the SCSI_task is busy at the time the state flag is checked, the code returns control to the polling loop. In general, the synthesized code for implementing the VIRTOS_wait command takes the form shown in FIG. 9(*b*).

Figure 9C:
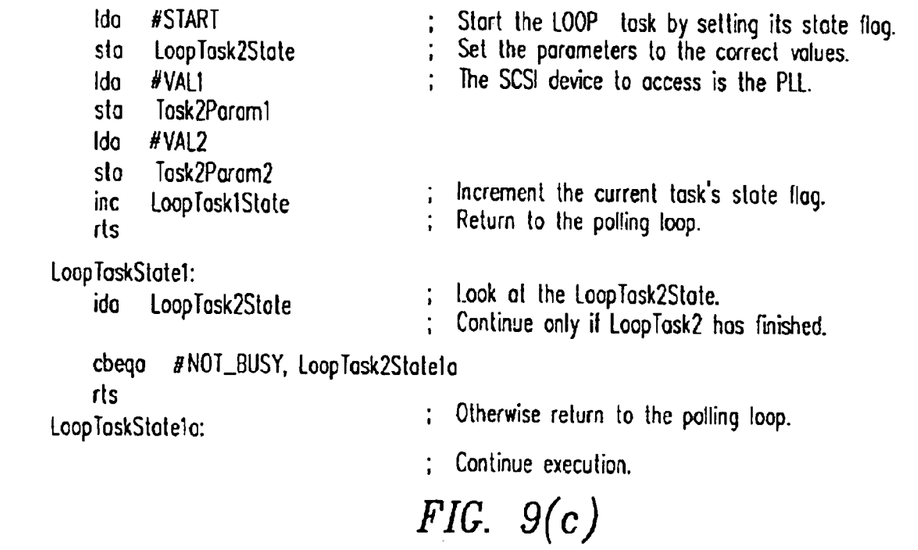
FIG. 9(c) shows the synthesized code for the VIRTOS_call command.

For each of the VIRTOS call commands, VIRTOS synthesizes code (a) to set the state flag SCSI_taskState of SCSI_task, (b) to assign values to the parameters of SCSI_task, (c) to increment state flag PLL_adjState, and (d) to return control to the polling loop. The SCSI_task is called by the polling loop upon determining from state flag SCSI-TaskState that SCSI_task has been called. In general, the synthesized code for implementing the VIRTOS_call command is shown in FIG. 9(*c*). The code for incrementing the state flag is not generated if the "wait" parameter of the VIRTOS_call command is set to "FALSE".

Figure 9D:
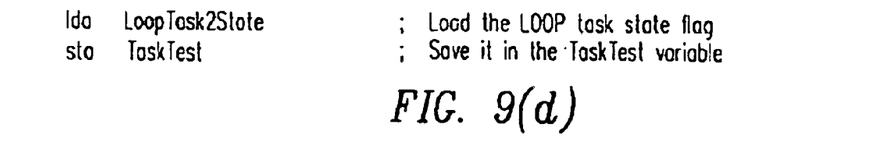
FIG. 9(d) shows the synthesized code for the VIRTOS_check command.

For the VIRTOS_check command, code is generated (a) to load the state flag to check, and (b) to assign the value of the state flag into the specified variable. The synthesized code for implementing VIRTOS_check is shown in FIG. 9(*d*).

Figure 10:
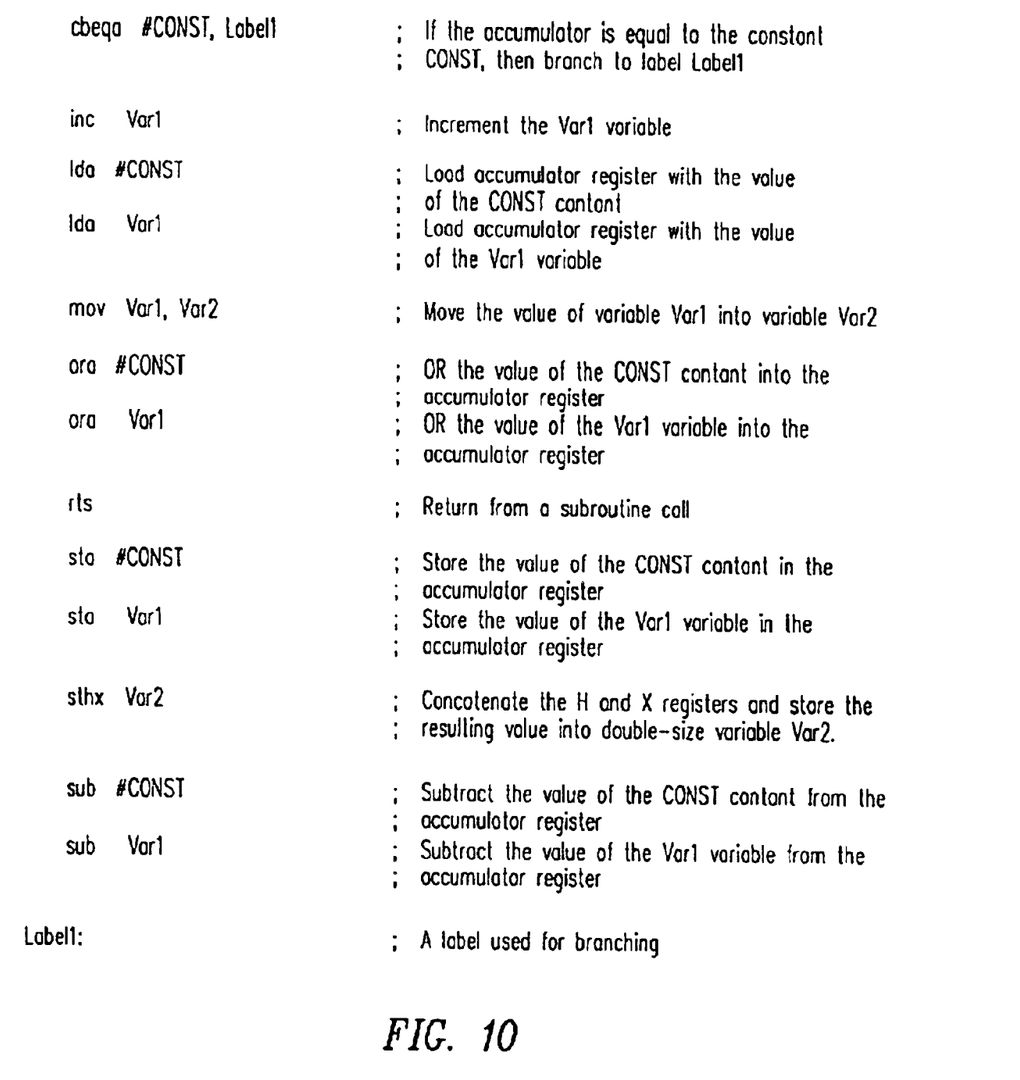
FIG. 10 provides descriptions of the Motorola HC08 assembly language instructions used in FIGS. 6(a)–9(d).

FIG. 10 provides descriptions of the Motorola HC08 assembly language instructions used in FIGS. 6(*a*)-9(*d*).

The above detailed description is provided to illustrate the specific embodiments of the present invention and is not intended to be limiting. Numerous variations and modifications within the scope of the invention are possible. The present invention is set forth in the following claims.

I claim:

1. A method for developing a real time task management system, comprising:

providing commands to be used in the source codes of a plurality of real time tasks, said commands being designed to provide synchronization among said plurality of real time tasks;

assigning a priority to each of said real time tasks;

synthesizing source code for a polling loop, that manages said plurality of real time tasks in accordance with said assigned priority of each task;

synthesizing source code for said commands used in said plurality of real time tasks; and converting, for execution by a computer, said synthesized source code for said polling loop and said synthesized source code for said commands.

2. A method as in claim 1, wherein one of said commands specifies waiting for the completion of a specified one of said plurality of real time tasks.

3. A method as in claim 1, wherein one of said commands specifies initialization of a specified one of said plurality of real time tasks.

4. A method as in claim 1, wherein one of said commands specifies execution of a specified one of said real time tasks.

5. A method as in claim 1, wherein one of said commands reports the execution state of a specified one of said plurality of real time tasks.

6. A method as in claim 1, further comprising a graphical user interface to allow users to specify said plurality of real time tasks.

7. A method as in claim 1, wherein each of said plurality of real time tasks is associated with state variables representing an execution state of said real time task.

8. A method as in claim 1, wherein one of said plurality of real time tasks comprises an interrupt service task which, in response to an interrupt, sets a task state flag that enables a second task in said polling loop to service said interrupt.

9. A method as in claim 1, wherein said step of synthesizing source code for a polling loop, synthesizes source code for dividing a real time task into executable sections with separate entry points.

* * * * *

UNITED STATES PATENT AND TRADEMARK OFFICE
CERTIFICATE OF CORRECTION

| | |
|---|---|
| PATENT NO. | : 6,934,947 B1 |
| APPLICATION NO. | : 09/309147 |
| DATED | : August 23, 2005 |
| INVENTOR(S) | : Robert Zeidman |

It is certified that error appears in the above-identified patent and that said Letters Patent is hereby corrected as shown below:

Column 2, line 62 delete "co" and insert --command--

Column 2, line 63 delete "and" first occurance

Column 4, line 60 delete "190" and insert --#--

Column 5, line 62 delete "VIRTOS call commands" and insert --VIRTOS_call commands--

Signed and Sealed this

Nineteenth Day of December, 2006

JON W. DUDAS
*Director of the United States Patent and Trademark Office*